(12) United States Patent  
Fortune et al.

(10) Patent No.: US 8,571,800 B2
(45) Date of Patent: Oct. 29, 2013

(54) USER INTERACTIVE ACTUAL TIME NETWORKED SURVEY SYSTEM

(75) Inventors: Kenneth Fortune, Rangiora (NZ); Christian Pagels, Grasbrunn (DE)

(73) Assignee: Trimble Navigation Limited, Sunnyvale, CA (US)

( * ) Notice: Subject to any disclaimer, the term of this patent is extended or adjusted under 35 U.S.C. 154(b) by 737 days.

(21) Appl. No.: 12/640,789

(22) Filed: Dec. 17, 2009

(65) Prior Publication Data

US 2013/0253822 A1     Sep. 26, 2013

Related U.S. Application Data

(63) Continuation-in-part of application No. 12/221,872, filed on Aug. 7, 2008.

(51) Int. Cl.
*G01V 3/15* (2006.01)
*G01V 3/12* (2006.01)
*G06F 12/02* (2006.01)
*G06F 3/01* (2006.01)

(52) U.S. Cl.
USPC .......... 702/17; 702/14; 702/188; 702/189

(58) Field of Classification Search
USPC ............ 702/14, 17, 141, 178, 188, 189; 701/301, 470; 707/609
See application file for complete search history.

(56) References Cited

U.S. PATENT DOCUMENTS

| | | | |
|---|---|---|---|
| 5,757,646 A * | 5/1998 | Talbot et al. ............... 701/2 |
| 6,226,601 B1 | 5/2001 | Longaker | |
| 6,324,473 B1 * | 11/2001 | Eschenbach ............... 701/470 |
| 6,327,533 B1 | 12/2001 | Chou | |
| 6,487,499 B1 | 11/2002 | Fuchs et al. | |
| 6,490,524 B1 | 12/2002 | White et al. | |
| 6,529,830 B1 * | 3/2003 | Eschenbach ............... 701/470 |
| 6,727,849 B1 | 4/2004 | Kirk et al. | |
| 7,020,701 B1 | 3/2006 | Gelvin et al. | |
| 7,480,511 B2 | 1/2009 | O'Meagher | |
| 2002/0169558 A1 | 11/2002 | Smith et al. | |
| 2003/0187979 A1 | 10/2003 | Hekstra et al. | |
| 2004/0022227 A1 | 2/2004 | Lynch et al. | |
| 2004/0145516 A1 | 7/2004 | Large et al. | |
| 2007/0219722 A1 | 9/2007 | Sawyer et al. | |
| 2007/0239999 A1 | 10/2007 | Honig et al. | |
| 2008/0120122 A1 | 5/2008 | Olenski et al. | |
| 2010/0070179 A1 * | 3/2010 | Cameron ............... 701/301 |
| 2010/0070465 A1 * | 3/2010 | Zeibak ............... 707/609 |

* cited by examiner

*Primary Examiner* — Marc Armand
*Assistant Examiner* — Felix Suarez (57) ABSTRACT

A method for providing user interactive actual time networked surveying is disclosed. In one embodiment, a network connection is established between a survey instrument and a central computing device. In addition, a user session is established with the central computing device. Survey measurement data obtained with the survey instrument is transmitted to the central computing device. In addition, correction data from a virtual reference station (VRS) is received at the central computing device. The user session is allowed to direct the processing of the received survey measurement data including one or more real time kinematic calculations at the central computing device. The output of the processing of the received survey measurement data is provided to one or more authorized devices having a connection to the central computing device, the output provided in a concrete and tangible format.

27 Claims, 6 Drawing Sheets

USER INTERACTIVE ACTUAL TIME NETWORKED SURVEY SYSTEM

CROSS REFERENCE TO RELATED APPLICATIONS

This application is a continuation-in-part of and claims priority to the co-pending patent application Ser. No. 12/221,872, entitled "REAL-TIME TRANSMISSION OF SURVEY DATA," Filed on Aug. 7, 2008, and assigned to the assignee of the present invention, the disclosure of which is hereby incorporated herein.

FIELD

The invention relates to surveying. In particular it relates to the dissemination of survey data.

BACKGROUND

In general, a Navigation Satellite System (NSS) refers to a position determining system that utilizes satellite-based position determining components or possibly a variety of terrestrial-based and satellite-based position determining components to determine a geographic position.

In one embodiment, the geographic position provided by the NSS describes the latitude and longitude at the receiving device's location. However, NSS's may also be used to determine elevation, speed, time, and the like. In most cases, the navigation satellite systems are global (e.g., GNSS), however, there are also NSS's that are regional (e.g, RNSS), local (e.g., LNSS) and the like. The present technology is well suited for use in one or a combination of NSS environments.

An NSS comprises a system of satellites that transmit information from which an observer's present location and/or the time of observation can be determined GPS is one such GNSS, however the Russian Global Orbiting Navigational System (GLONASS), is an alternative or supplemental system and the European Galileo, the Indian Regional Navigational Satellite System (IRNSS), and Chinese Compass systems are also under development.

In particular, a GNSS uses the transmission of coded radio signals from a family of earth-orbiting satellites (up to 32 satellites for GPS) to calculate a receiver's position. A GNSS antenna receives GNSS signals from a plurality (preferably four or more) GNSS satellites and passes these signals to a GNSS signal receiver/processor, which identifies the GNSS satellite source for each GNSS signal, determines the time at which each identified GNSS signal arrives at the antenna, and determines the present location of the GNSS satellites, from which the receiver's location is calculated.

For example, in one embodiment the positions received from NSS receivers, computed while the receiver's antenna is in a certain physical situation, can be recorded. This information can be used as observations for topographical surveying, mapping, set-out functions and the like.

SUMMARY OF THE INVENTION

Embodiments provided herein recite methods and systems for providing user interactive actual time networked surveying. In one embodiment, a network connection is established between a survey instrument and a central computing device. In addition, a user session is established with the central computing device.

Survey measurement data obtained with the survey instrument is transmitted to the central computing device. In addition, correction data from a virtual reference station (VRS) is received at the central computing device.

The user session is allowed to direct the processing of the received survey measurement data including one or more real time kinematic calculations at the central computing device.

The output of the processing of the received survey measurement data is provided to one or more authorized devices having a connection to the central computing device, the output provided in a concrete and tangible format.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF EMBODIMENTS

Reference will now be made in detail to embodiments of the invention. While the invention will be described in conjunction with the different embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the embodiments in accordance with the present invention, numerous specific details are set forth in order to provide a thorough understanding of the embodiments of the present invention. However, the embodiments in accordance with the present invention may be practiced without these specific details. In other instances, well-known methods, procedures, components, and circuits have not been described in detail so as not to unnecessarily obscure aspects of the embodiments in accordance with the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the embodiments in accordance with the present invention, discussions utilizing terms such as "receiving" or "processing" or "decrypting" or "encrypting" or "decoding" or "encoding" or "acquiring" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One embodiment described herein relates to GPS Receiver Patents Showing General Functionality as described in detail in U.S. Pat. No. 4,847,862 issued Jul. 11, 1989 and which is assigned to the assignee of the present application, and in U.S. Pat. No. 5,486,834 issued Jan. 23, 1996 which is assigned to the assignee of the present application, and in U.S. Pat. No. 5,621,416 issued Apr. 15, 1997 which is assigned to the assignee of the present application and which are incorporated by reference for all purposes.

TERMINOLOGY

One embodiment herein will utilize NSS to refer to a GPS, GLONASS, and/or any other compatible satellite-based navigation system that provides information by which an observer's position, velocity, time or combination thereof of observation can be determined.

In general, NSS uses the transmission of coded radio signals from a family of earth-orbiting satellites (24 satellites for GPS) to calculate a receiver's position. An NSS antenna receives NSS signals from one or more NSS satellites and passes these signals to an NSS signal receiver/processor, which identifies the NSS satellite source for each NSS signal, determines the time at which each identified NSS signal arrives at the antenna, and determines the present location of the NSS satellites, from which the receiver's location is calculated.

Differential Global Positioning System (DGPS), in turn, is a technique that significantly improves both the accuracy and the integrity of the GPS. The most common version of DGPS requires high-quality GPS "reference receivers" at known, surveyed locations. The reference station estimates the slowly varying error components of each satellite range measurement and forms a correction for each GPS satellite in view. This correction is broadcast to all DGPS users on a convenient communication link. Typical ranges for a local area DGPS (LADGPS) station are up to 150 km and expected accuracies with DGPS are within the range from 1 to 5 meters.

Most DGPS systems use a single reference station to develop a scalar correction to the code-phase measurement. However, in what is known as wide area DGPS (WADGPS) a network of reference stations can be used instead to form a vector correction for each satellite. This vector consists of individual corrections for the satellite clock, three components of satellite positioning error (or ephemeris), and parameters of an ionospheric delay model. The validity of this correction still decreases with increased latency or age of the correction. However, compared to a scalar correction, a vector correction is valid over much greater geographical areas.

Users with very stringent accuracy requirements may further improve accuracy by making use of a technique called carrier-phase DGPS (CDPGS). These users measure the phase of the GPS carrier relative to the carrier phase at a reference site, thus achieving range measurement precision that is a few percent of the carrier wavelength, typically about one centimeter. These GPS phase comparisons are used in survey applications, where the antennas are separated by tens of kilometers. If the antennas are moving, the position fix is said to be kinematic, and is also referred to as Real Time Kinematic (RTK).

Thus, making use of RTK, as a rover traverses the terrain, its position, bearing, attitude and other attributes about the rover movement can be constantly monitored, and the coordinates transmitted to a central location, typically according to a standard data format such as, for example, an National Marine Electronics Association (NMEA) protocol.

Rovers are typically connected to a server by means of a bidirectional communications link in order to allow rover units to transmit their current positions as NMEA messages to the server. GPS correction data is in turn transmitted to the various rovers and the corrected positional information sent back to the server. This typically takes place on the same line that a rover receives the reference correction stream on and is usually implemented by a wireless link, such as radio, cellular telephony, and the like. In a Virtual Reference Station (VRS) environment the NMEA communications that transmit the positional information of the rovers take place between the rover units and a VRS server.

In the course of a survey operation, a rover makes survey measurements at selected locations as part of a project and stores these in a local memory. This information is subsequently made available as a job file once the rover returns to a central station with the disk.

Figure 1:
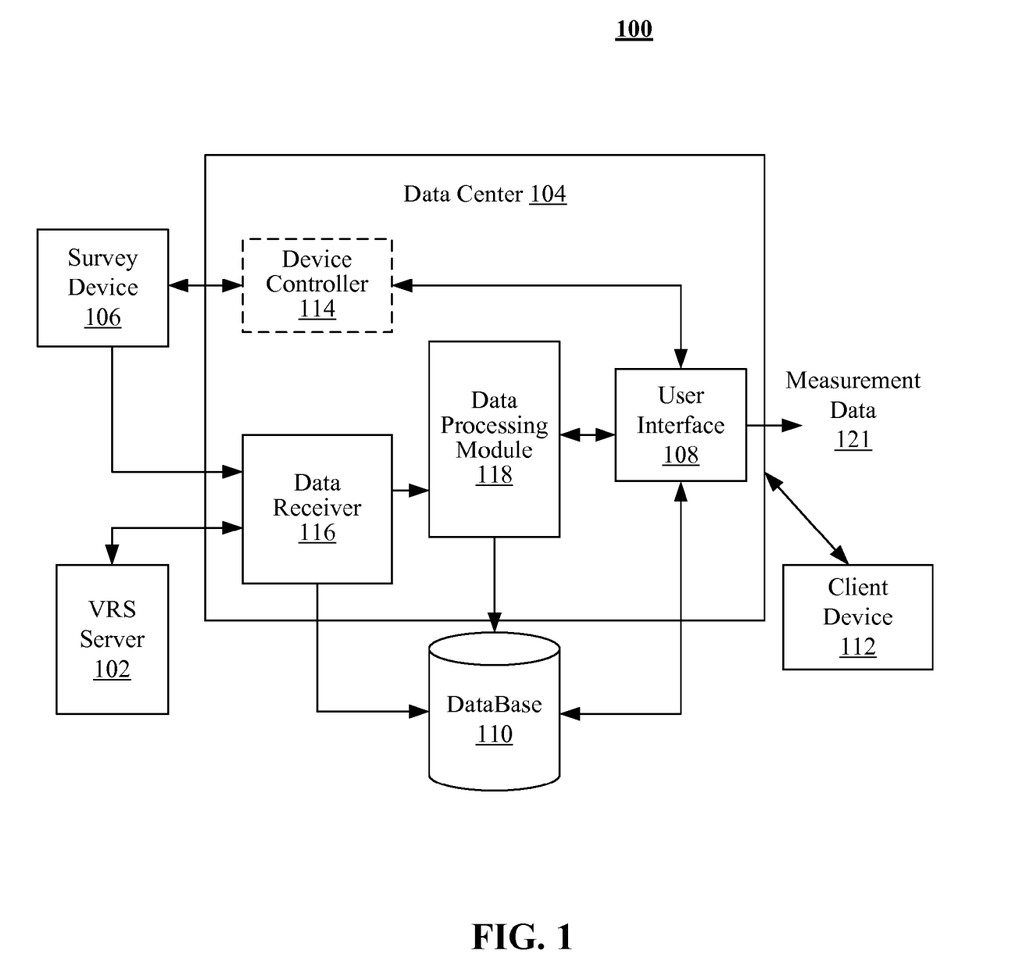
FIG. 1 is a block diagram of user interactive actual time networked survey system in accordance with one embodiment of the present technology.

With reference now to FIG. 1, a block diagram 100 of user interactive actual time networked survey system is shown in accordance with one embodiment of the present technology. In one embodiment, diagram 100 includes a survey device 106, a VRS server 102, a data center 104, a database 110 and a client device 112. In another embodiment, data center 104 includes a data receiver 116, data processing module 118, user interface 108 and optional device controller 114. In yet another embodiment, components such as database 110, client device 112, etc. may be within the data center 104. Similarly, in another embodiment, components such as device controller 114, data receiver 116, data processing module 118 and/or user interface 108 may be remote from data center 104.

Moreover, in one embodiment, any or all of the modules and devices shown in FIG. 1 may be in the same location, in a plurality of different locations, or a combination thereof. In other words, survey device 106 may be in a location that is physically distinct from VRS server 102, data center 104 and/or client device 112. In another embodiment, two or more components shown in FIG. 1 may be in the same physical location or active upon a single device. For example, client device 112 may be the same as survey device 106. Moreover, although only one of each type of device or component is shown for clarity, the present technology is well suited to utilization with a plurality of any or all of the device and components shown. For example, the technology is well suited to utilization with any number of survey devices 106, VRS servers 102, databases 110, user interfaces 108, data receivers 116, data processing modules 118, device controllers 114, client devices 112, data centers 104, etc.

In one embodiment survey information (also referred to herein as raw measurement data) is sent from a survey device 106 to data receiver 116 of data center 104. Although one survey device 106 is shown, it should be understood that the embodiments described herein are well suited to any number of rover units. In general, a survey device may be a mobile (rover) unit that collects survey measurement data at selected points, an optical surveying device, or any other type of measurement device capable of operating manned, unmanned, automatically, in a pre-programmed format, remotely controlled, manually controlled, or the like.

In one embodiment, correction data is sent from a VRS server 102 to data receiver 116 of data center 104. Although in one embodiment the survey measurement data is transmitted immediately upon survey device 106 making the measurement, in another embodiment a storage medium is provided at survey device 106 to allow the survey measurement data to be stored in memory for subsequent transmission to data center 104. This would provide a suitable solution for situations where terrain, weather or other conditions prevent survey device 106 from transmission of the data to data center 104 immediately. In other words, the data could be stored in the memory of survey device 106 until such time that a transmission of the data can be made, which could be prior to, during, or after any one of the subsequent measurements is made. This would allow survey device 106 to continue to collect survey measurement data pending the transmission of previously collected and stored survey measurement data.

In one embodiment, reference was made to a GPS based survey device 106. However, in another embodiment, survey results may be obtained using an optical Total Station transmitted in real time to data center 104 using a modem and Wide Area Network (WAN) arrangement. In yet another embodiment the survey results from a laser scanner may be captured in real time by transmitting the survey information to a server in accordance with the invention.

With reference still to FIG. 1, in one embodiment, survey device 106 sends measurement data directly to data center 104. Moreover, in one embodiment a user on client device 112 and/or via user interface 108 enters survey data such as the start and end times, antenna height and point name. One user interface is an internet web browser. In one embodiment, user interface 108 interacts directly with a server at the data center 104. In one embodiment, the output measurement data 121 does not necessarily involve the VRS server 102 data but may instead be only raw survey data as received from survey device 106.

However, in another embodiment, the measurement data received at user interface 108 or client device 112 is corrected measurement data. For example, the raw data from survey device 106 has been corrected with data from a VRS server 102 at data center 104. Additionally, in one embodiment, the data center 104 may provide the raw survey device 106 data, the correction data from VRS server 102 and the corrected data to database 110. As such, user interface 108 and/or client device 112 may be able to access raw data, corrections data and/or corrected data.

Moreover, as described in more detail herein, the present technology is well suited to providing a number of different sets of correction data from various VRS servers 102 to data center 104 and/or database 110 such that a user may select which correction data is applied to the raw data from survey device 106, may generate an average correction utilizing multiple data sets from various VRS servers 102, or the like. For example, as described above the survey device 106 sends measurement data directly to data center 104. In one embodiment, client device 112 or user interface 108 allows a user to direct data center 104 how to use the measurement data as it is received from survey device 106.

In one embodiment, RTK calculations are then performed at the data center 104, such as at data processing module 118. The results of the RTK calculations and corrections are stored then stored in database 110. The data are made available via a user interface 108, client device 112, or the like.

For example, German cadastral surveying requires GNSS-measured points to be measured from two different reference stations. Being able to calculate positions from two stations simultaneously may be acceptable as a means to reduce costs as the operator need only visit a point once to gain both measurements. The real-time differences between the two solutions could be displayed to the user as they work. Furthermore, different RTK algorithms could be used to calculate positions, and the real-time comparison between them is thus continually available. This can assist software development, customer acceptance of new technologies, and measurement quality control.

As stated herein, in one embodiment, the calculated RTK measurements are stored directly in database 110 along with any survey data entered by the user via user interface 108, client device 112, or the like. This survey data may include start and end times, antenna height, point name, etc.

User interface 108 provides access to database 110 thereby allowing a user to make use of the data. This allows any authorized client such as the rovers 106 performing the survey operation, or a client device 112 to connect via a data link and download the required information. Thus, client device 112 may continually monitor survey device 106 performing a survey operation and view the results and corresponding positions of survey device 106 even prior to survey device 106 returning to a point of beginning (POB) or even if there is no return to the POB. Moreover, in another embodiment, client device 112 and/or survey device 106 may also have access, e.g., view results and corresponding information from one or more other rover unit(s) 106 and/or client devices 112.

In general, client device 112 may be a personal digital assistant (PDA), a mobile telephone, a pager, a hand portable computing device, and the like. In one embodiment client device 112 comprises a computing system such as described in FIG. 5. For example, client device 112 may include a processor 502 coupled with an address/data bus 501. Processor 502 is for processing digital information and instructions and bus 501 is for conveying digital information between the various components of client device 112. Also coupled with bus 501 is a non-volatile read only memory (ROM) 504 for storing information and instructions of a more permanent nature, and a random access memory (RAM) 503 for storing the digital information and instructions of a more volatile nature. In one embodiment, client device 112 may include a unique identifier, such as an International Mobile Equipment (IME) number or a specific Trimble number.

Figure 6:
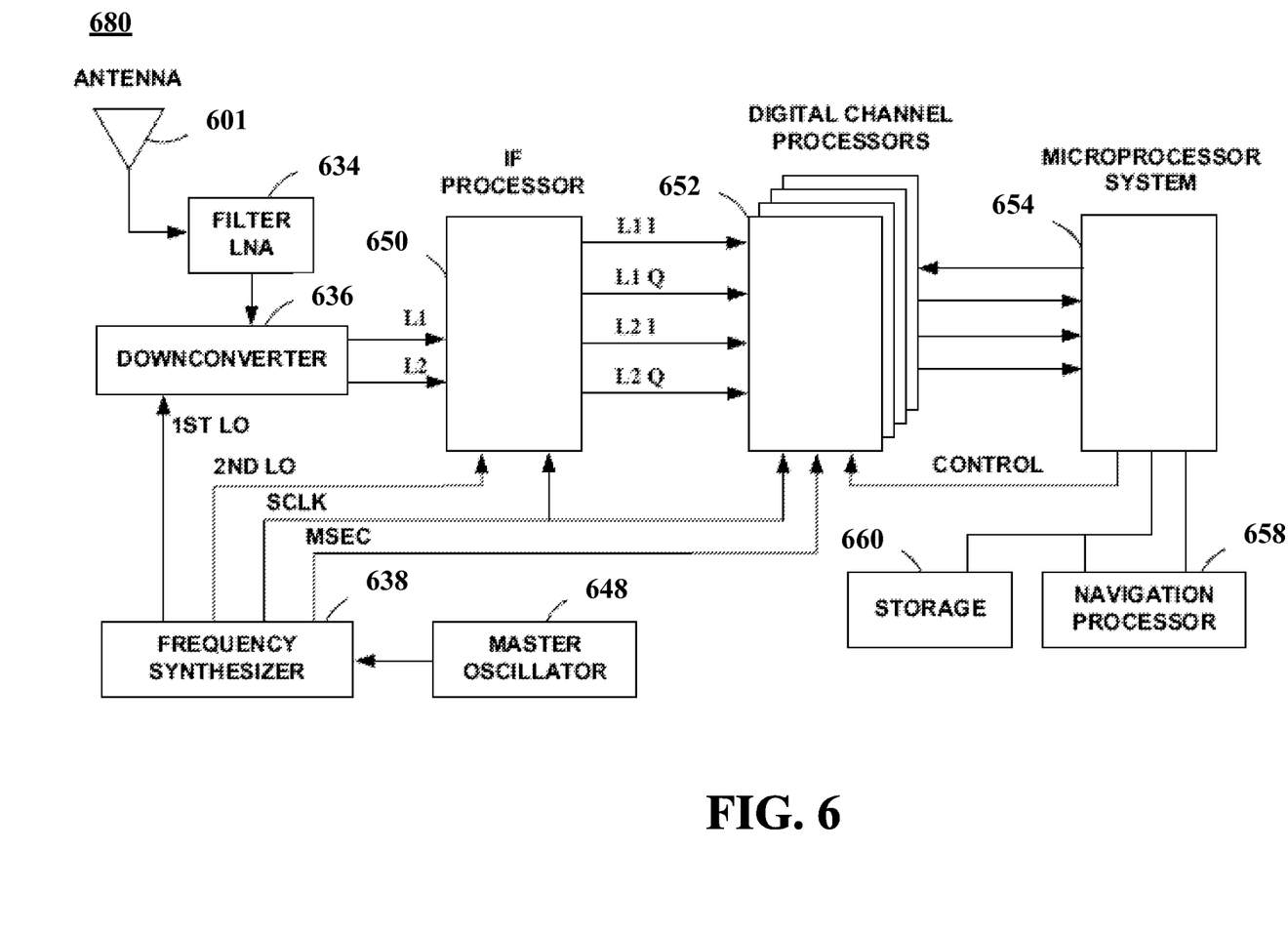
FIG. 6 is a block diagram of an example NSS receiver which may be used in accordance with one embodiment of the present technology.

Client device 112 may include a position determining components such as a Global Navigation Satellite Service (GNSS) receiver and antenna as described in detail in FIG. 6. Although a GNSS receiver and antenna is described, client device 112 may be well suited to utilize a variety of terrestrial-based and satellite-based position determining systems. For example, terrestrial based broadcast signals such as radio beacons available via wireless local area network systems commonly called "Wi-Fi" hotspots, a trademark of the Wi-Fi Alliance that certifies products based on IEEE 802.11 standards well-known in the radio networking arts.

In one embodiment, a user may utilize client device 112 having a graphical user interface (GUI) or the like to control survey device 106 remotely via device controller 114. For example, data center 104 provides device controller 114 with direct access to survey device 106 such that a user can direct survey device 106 to generate desired position information, perform new or repetitive survey information, and the like from a remote or "safe" location.

In one embodiment database 110 may be an Internet server. In another embodiment, the data stored at database 110 may be password protected.

Since, in accordance with the invention the survey data for each point is transmitted once the measurement is made without first locally gathering the information for all the survey points, the present technology avoids the need to wait for the end of a survey to use the data. As soon as the first data is on the database 110 it can be used by authorized users such as being accessed by user interface 108 or client device 112.

Thus, in one embodiment since survey device 106 transmits all information in independent messages to a data center 104 all job information may be rebuilt, thereby avoiding problems such as loss of information between the time the data is gathered by survey device 106 and the time that the data is transmitted by survey device 106. Also, since the information is immediately available from data center 104 and/or database 110 the locations of the survey device 106 and the survey measurement results may be monitored, controlled, reviewed, and/or utilized in real time or near real time. In other words, the survey measurement data will be available at or almost at the time the survey measurement information is initially obtained by survey device 106. This allows measurements to be observed, evaluated, reviewed, or additional measurements made while survey device 106 is still in the field.

Additionally, since survey device 106 is remotely accessible via data center 104, one embodiment is well suited to having a first user utilize a client device 112 to remotely control survey device 106 and generate one or more measurements; and then, when the first user has finished utilizing survey device 106 it may be accessed by a second user utilizing the same or a different client device 112 to remotely control survey device 106 and generate one or more different survey measurements. Moreover, as stated herein, embodiments are well suited to a plurality of client devices 112 accessing database 110 to observe, evaluate and/or review information from one or more rover(s) 106 at similar times. This means supervisory personnel can see what is happening in the field, evaluate results and situations, and make decisions regarding operational changes or adjustments in near-real time.

In one embodiment measurement data 121 including the locations or points of the survey measurement data may be superimposed onto a map for ease of visualization. In general, the map may by any aerial photograph, terrain map or other geographic representation of the area where the survey operation is taking place that may be presented on a GUI.

In one embodiment, data receiver 116 will provide both the raw measurement data and the correction data to data processing module 118. Data processing module 118 will generate processed measurement data that is sent to user interface 108 and database 110. In one embodiment, the NMEA standard is utilized during data processing. For example, kinematic location information may be received as a GGA record in the NMEA frame, and may be sent at regular intervals, e.g., every 10 seconds. The raw measurement data is combined at data processing module 118 by adding one or more records, e.g., a MRES record to the NMEA frame whenever a point measurement is received. Depending on the data that is received with each measurement, one or more additional records may have to be included in the NMEA frame. The NMEA message, in accordance with an embodiment, will thus contain the results of a point measurement.

In one embodiment, data processing module 118 sends the processed NMEA message for storage to a networked database 110. Thus, each time a survey measurement is made the NMEA message includes all required information to represent the full measurement results of a survey point as is discussed in greater detail below. In one embodiment, the survey measurement data is organized by user/rover, project and session in database 110. However, the present technology is well suited to numerous diverse organizational methods for use with respect to database 110.

In one embodiment the position and the measurement results are thus available in real-time and visually represented on an aerial photograph of the region to provide the following information:

Project information (name, purpose . . . )

User information (name, company . . . )

Reference information (receiver, antenna . . . )

Rover hardware information (receiver, antenna, firmware . . . )

Station setup (system to measure in . . . )

Reference position information (coordinates . . . )

Measurement results (point id, vector to reference, covariance matrix, feature code, observation statistics . . . )

In one embodiment, to provide the full range of information set out using an NMEA message frame, several additional records may be included. For example, the project information can be transmitted as a GPUID message in a separate frame, while the reference position coordinates can be transmitted as part of yet another frame.

The following example, is one embodiment of a message that may be included in the NMEA frame

| MRES message | | |
|---|---|---|
| Sect | * Field | Description |
| 0,1 | * $PTNL,MRES | |
| 02 | * wwww, | week of measurement (int) |
| 03 | * ssssss.sss, | seconds of week of measurement (double) |
| 04 | * refId | station id of reference station (string) empty for now |
| 05 | * refX | x coordinate of reference station (double) WGS84 |
| 06 | * refY | y coordinate of reference station (double) coordinate system to be defined |
| 07 | * refZ | z coordinate of reference station (double) coordinate system to be defined |
| 08 | * refAnt | antenna type of reference station (int) set to 255 if unknown |
| 09 | * refh | antenna height of reference station (double) measured to ARP |
| 10 | * stationId | station id of measured point (string) might be empty |
| 11 | * dX | x coordinate of measured vector (double) |
| 12 | * dY | y coordinate of measured vector (double) |
| 13 | * dZ | z coordinate of measured vector (double) |
| 14 | * stationAnt | antenna typo of measurement (int) set to 255 if unknown |
| 15 | * stationh | antenna height (double) measured to ARP |
| 16 | * Covxx | covariance matrix element for xx (double) |
| 17 | * Covxy | covariance matrix element for xy (double) |
| 18 | * Covyy | covariance matrix element for yy (double) |
| 19 | * Covxz | covariance matrix element for xz (double) |
| 20 | * Covyz | covariance matrix element for yz (double) |
| 21 | * Covzz | covariance matrix element for zz (double) |
| 22 | * nSat | number of satellites (int) might be empty |

-continued

MRES message

| Sect | * Field | Description |
|---|---|---|
| 23 | * nStatEp | number of static epochs (int) |
| 24 | * pdop | pdop of measurement (double) |
|  | * *hh | Checksum |
|  | * <CR><LF> | Terminator |

In one embodiment, the use of data center 104 provides improved connectivity. For example, a data collector application running on a server in data center 104 allows fast importing of data into a given project. This data may include gridded terrain models, gridded datum shift grids, aerial photographs, DXF drawings, scanned line drawings and other artwork, set out plans, collections of control points and monuments including co-ordinates, other stored survey work and other observed field data including GPS and other technologies observations.

Another benefit of making more use of a server on data center 104 is the availability of more real time processing power. A server typically has more processing power available than a portable device such as survey device 106 or the like. The server typically has the ability to run multiple RTK processors simultaneously. This simultaneous processing is useful for example when calculating a user position from several base station data streams.

Moreover, in one embodiment, utilizing the server permits functions such as logging the GPS observations at the highest supported epoch rate. The data can then be offered for download through user interface 108 at a variety of lesser epoch rates. Decimation of the data is performed at the moment the user requests the file for download.

A further benefit of using the server in data center 104 is the availability of much more data storage capacity than what is normally available in a rover receiver system at survey device 106 or client device 112. This permits many more data manipulations of various data files. A user is also able to log all GPS observables at all times, even if they do not intend to use the observables for post-process wok, since the cost to store additional observables is minimal if stored on the server. Consequently there is almost no extra cost for logging the data. If the data is later needed then it is available from data center 104 or database 110.

A further benefit is that of greater security. Having the data applications running on a server of data center 104 means that the data is more secure. For example, data can be backed up in real time and may reside in a secure database 110. The data could also be downloaded to designated and approved desktop computers or other client device 112 very quickly, using normal secured data transmission processes. Moreover, field devices such as survey device 106 and the like are subject to very harsh environments as well as the threat of theft or loss. As such, the probability of data loss is much higher if the data is stored only on survey device 106. However, the probability of total data loss is significantly reduced if the data is stored off-site for example at data center 104 and/or database 110, where appropriate backup methods and hardware are incorporated in the server system.

Another security factor is the ability for an operator to protect application software from copying or theft of intellectual property. In one embodiment, because the software and associated intellectual property are maintained on a server in data center 104 and/or database 110, the information is never actually copied to any unauthorized user computer. Thus, a potential thief must break into database 110 and/or data center 104 to gain access to the information. Server security can be implemented and techniques employed that are used to prevent copying or reverse engineering of operational software that might be delivered into a customer's hands.

Additionally, from time to time it may be necessary to update data processing software. Utilizing centralized systems such as data center 104 permits faster operational updates. Moreover, in one embodiment it is necessary to only update the software in data center 104 rather than updating individual field computer firmware, such as survey device 106, client device 112 and the like. This has the potential to greatly simplify use of the system.

A further benefit of running the application software on a server in data center 104 is the ability for multiple users to have access to the same data set simultaneously. An effect of this is that work flows are possible such as a surveyor in the field contacting a company office and requesting someone upload information to the site then having it immediately available for field survey work. As such, in one embodiment there is no need for the surveyor to stop other ongoing field work.

Similarly, multiple simultaneous accesses to the data provides the opportunity for multiple surveyors in the field to work on the same job and allocate work on the fly, for example points to survey. Moreover, in one embodiment, immediate validation is possible if all points have been observed. In other words, one person can do quality control while another is doing the field survey work. As such, data that is of insufficient quality can be flagged for re-measurement while the surveyor, rover, or the like is still on site.

Figure 2:
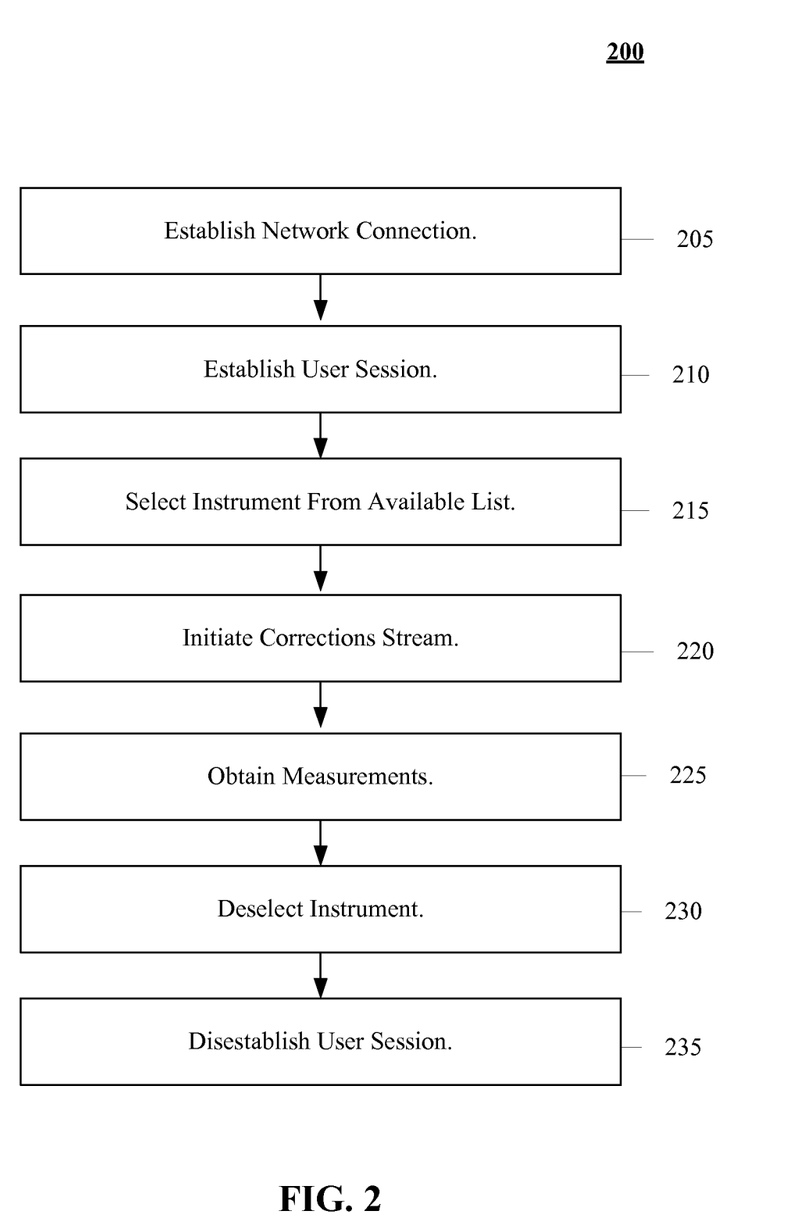
FIG. 2 is a flowchart of a method for utilizing an NSS rover in accordance with one embodiment of the present technology.

Referring now to FIG. 2, a flowchart 200 of a method for utilizing an NSS rover in accordance with one embodiment of the present technology is shown. At 205, a user establishes a network connection. This establishment typically involves a user starting up a mobile computing device and connecting to the internet. The user starts up the GPS receiver and initiates a built-in internet connection sequence of the receiver. The user then navigates to a website login page using a web browser. The login page provides an on-line surveying service for example the Trimble on-line surveying service.

At 210 a user session is established. In one embodiment, to establish a user session the user enters for example an organization name, user name and password.

The user selects a suitable function such as "field surveying" from a menu and is presented with a list of instruments that are registered with that organization and that are currently on-line. At 215 an instrument, such as survey device 106 is selected from an available list.

If the instrument is new the user optionally initiates an extra registration process to add that instrument to the list of those available to them. This registration process may include for example providing a serial number to the on-line service. The user optionally enters a password or pin into the instrument itself. A further example includes setting the instrument into a dedicated "claimable" mode for a short period of time by pressing a key sequence on the instrument key panel or some other equivalent method.

Once the user has selected the instrument the user wishes to use, the web page shows the instrument current status for example its position, satellites in view and battery level. The page further provides links to select a particular project or job to be worked on and to select the surveying settings to use for the upcoming work.

Suitable settings include setting the type of real time correction method to be employed. This includes for example no correction, DGPS, single station RTK, network RTK, or any suitable equivalent. In one embodiment, satellite observation data for post process functions is automatically logged.

If desired, a low cost survey mode is used that uses RTK to identify when segments of data can be initialized. By initialized it is meant in the context of a GPS system where data is able to be computed to a centimeter level precision. The low cost survey mode does not preferably provide RTK positions in real time to the user. In a further embodiment the conventional post process survey technique of estimating initialization quality based on time tracked is on offer.

At 220 a corrections stream is initiated. The status display indicates when the processor is calculating high precision co-ordinates and the status of data logging and other related services. Typically a couple of seconds after the service is started (if RTK is used) the service will be able to deliver centimeter level positions. This can be affected by the environment that the user is in for example proximity to buildings and steep terrain, trees and so on.

With reference now to 225 of FIG. 2, measurements are obtained. In obtaining measurements the user starts one of a plurality of measurement types. These are typically forms of static point measurement or continuous (moving path) measurement. As the measurements continue, the display page shows the status of the operation. Measurements are optionally configured to end automatically when the system has collected sufficient data to meet predefined criteria. Alternatively the user manually decides when to end the measurement. A manual process such as this includes for example clicking a button or suddenly starting to move after being stationary for a period of time. The user continues to collect measurements and may wish to stop and restart the corrections service between observations as a cost saving measure.

In one embodiment, the mobile computing device can be separate from the GPS receiver. This allows functions such as placing the receiver in a hazardous location. In this case the surveyor controlling the survey is at a different location to the receiver. One example is where the surveyor is in a position where the surveyor can visually check an alignment or oversee an operation from a vantage point. This permits the GPS receiver to be deployed on an unmanned vehicle such as a small boat, cart, railway wagon or drone aircraft. This permits measurements to be taken from locations where an operator is unable or unwilling to be present. This avoids dangerous or unsuitable conditions for the operator. Unsuitable conditions include bad weather.

With reference now to 230, once the user has completed observing data the instrument is deselected. For example by specifying to the system to disconnect from the receiver or alternatively the user simply turns the receiver off.

At 235 the session is discontinued.

Figure 3:
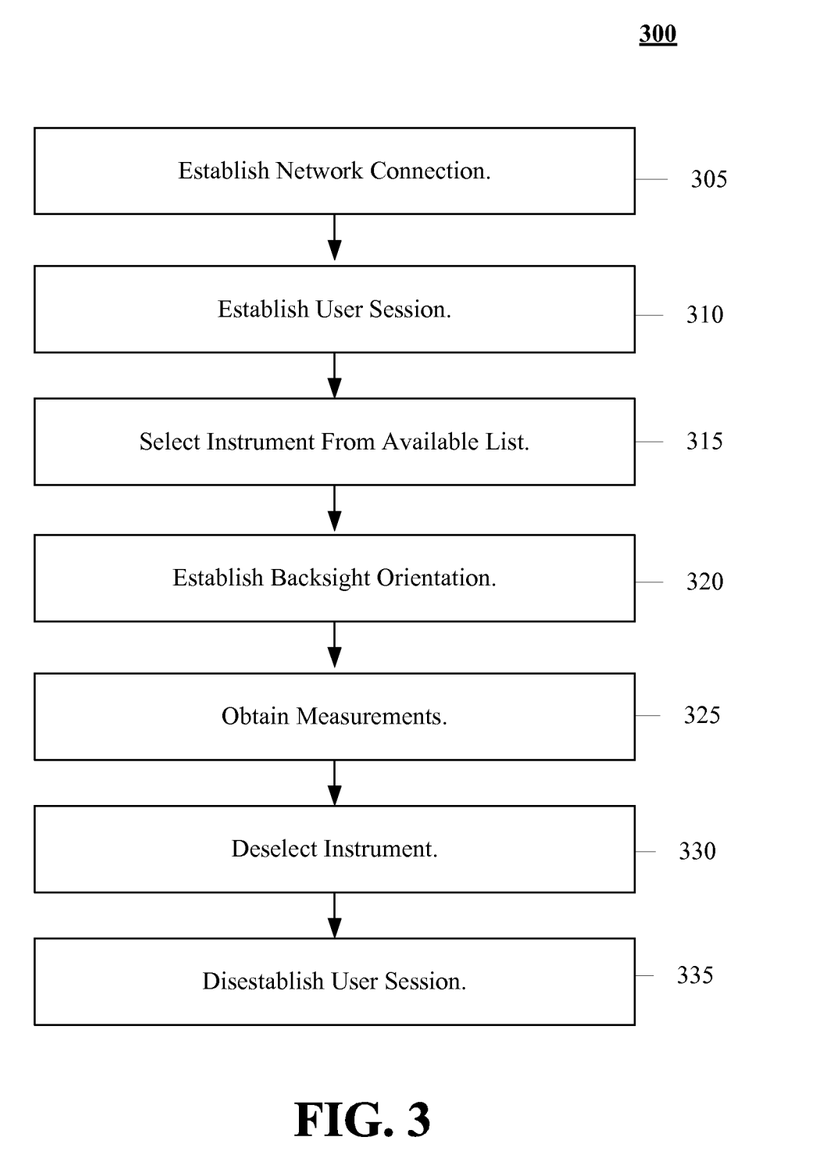
FIG. 3 is a flowchart of a method for utilizing an optical instrument in accordance with one embodiment of the present technology.

Referring now to FIG. 3, a flowchart 300 of a method for utilizing an optical instrument in accordance with one embodiment of the present technology.

At 305 of FIG. 3, a network connection 305 and a user session 310 are established. For purposes of clarity, 305 and 310 are similar in nature to 205 and 210 of FIG. 2 respectively.

At 315 of FIG. 3, an instrument, such as survey device 106 or the like, is selected from the available list similar to 215 of FIG. 2.

Once the user has selected the instrument the user wishes to use, the web page displays the current status of the instrument for example the level bubble, temperature and pressure, battery level and so on. The web page provides links to select the project or job to be worked on. The web page also provides a selection to allow selection of the surveying settings to use for the upcoming work. The settings include setting the types of measurement methods to be employed. These methods include high accurate, continuous, prism or normal reflection surface, visible laser pointer enabled, target tracking options, target type and geometry, surface scan areas and densities. Continuous measurement data possibly for post process functions is automatically logged. This option stores video images or movie segments on high end instruments with sufficient internet connectivity.

At 320 backsite and orientation of the optical device are established. In one embodiment, the user starts measuring backsite observations. These observations are needed to orient the instrument so that it knows which way it is pointing.

In another embodiment the user is presented with lists of known points to choose from. These points can be displayed on a map. Further displays include photographs and other diagrams to help locate and identify markers.

At 325 of FIG. 3, measurements are obtained. The user can observe new points at any time. Typically the user performs a set up then a measurement. However in some cases a user may prefer to measure some points first and perform the orientation some way through their work. In one embodiment, the user is only able to see real world co-ordinates for user measurements as they work once they have done a set up.

The field computer is able to be separate from the optical instrument. As described above, this permits the optical instrument to be placed in a hazardous location thereby permitting the surveyor to remain in a safer or more desirable location.

At 330 of FIG. 3, once measurements have been obtained the instrument is deselected by disconnection or power off and the user session 335 is discontinued.

Figure 4:
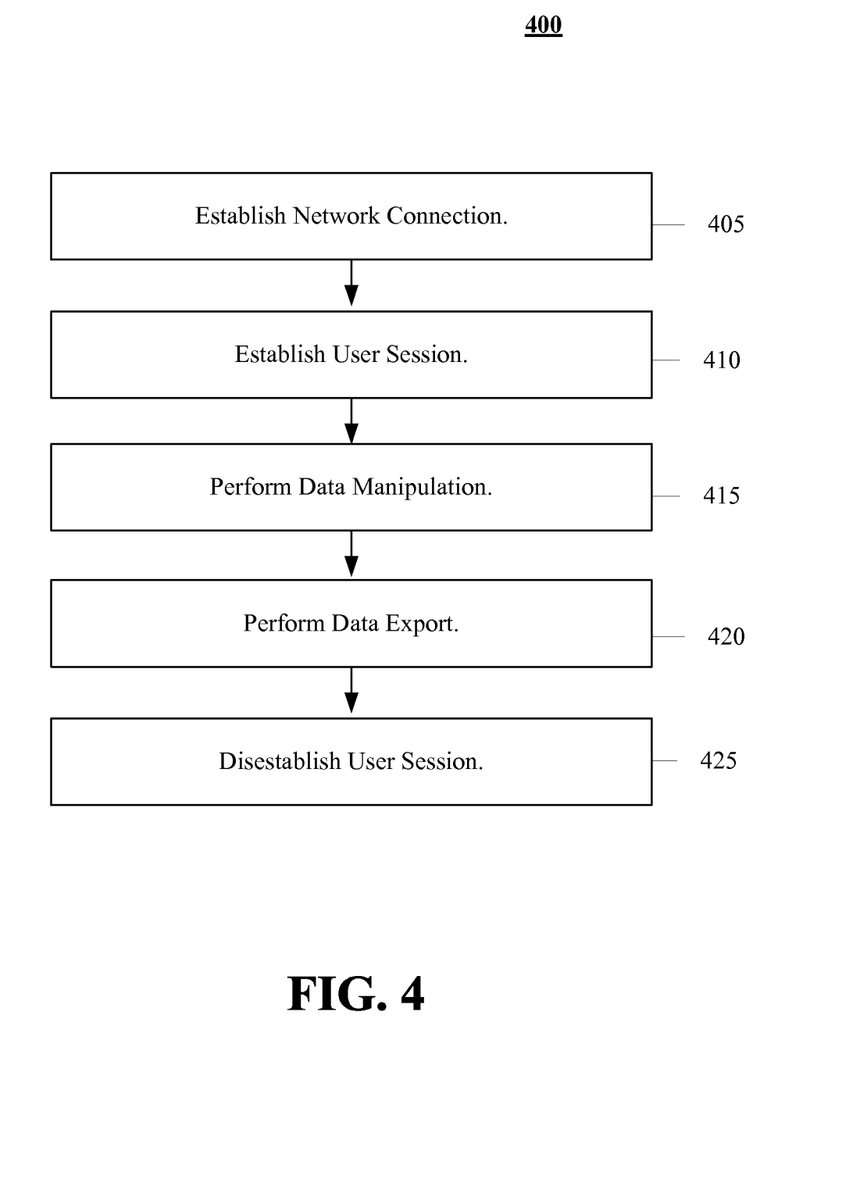
FIG. 4 is a flowchart of a method for data manipulation and export in accordance with one embodiment of the present technology.

Referring now to FIG. 4, a flowchart 400 of a method for data manipulation and export in accordance with one embodiment of the present technology. This process is suitable following use of both GPS and optical instruments. Once the user has completed observing the data the user is able to inspect their data or the data of someone else, such as from their organization, another organization, or any other data which they are authorized to access.

As similarly described in FIGS. 2 and 3, at 405 a network connection is established. At 410 a user session is established within the network connection.

At 415 of FIG. 4, the option of performing data manipulation is provided. For example, the user may choose to perform calculations on the data such as to average several different observations at the same point, or to calibrate a co-ordinate system over a site area. In another embodiment, the user may wish to inspect the data in more detail such as to look at tables of measurement quality, or of the quality of the GPS signals observed during the survey operation.

Following this data inspection and manipulation, the user may determine that the user needs to do some more surveying or they may decide that they wish to download the data. In a preferred embodiment these functions are all available from a series of menus on the web pages accessible by the user.

At 420 the data is exported. For example, once the user decides to download data, the user goes to a page that has links to download the data in one of several different formats.

In one embodiment the server does not actually store the data in the desired format as it is collected. In this case the server performs a conversion of the data to the desired requested format. These formats may include industry standard formats and also user defined formats. User defined formats include reports generated using cascading style sheet specifications.

It is anticipated that data manipulation and export includes specifying filters to pass over the data during its output. One example of the filter is the selection of a percentage (for example 10%) of the GPS observations to obtain a small sample check file. Another example of a filter involves sending only static points. Continuous segments are optionally obtained at a later date.

At 425 the user session is discontinued. This disestablishment is effected by either logging off the site when finished or the implementation of a time out once the user is no longer viewing the site.

Where the instrument is an optical instrument, at the stage of inspecting the data and performing data manipulation 415, the user could elect to observe more data. For example they could do work flows such as observing a new set up (orientation), and recalculate all measured points. Alternatively the user could replay the work flow to enable them to identify errors or block out sections or data. This could occur for example when an instrument was bumped during surveying.

In one embodiment, the user is provided with a usage based fee structure. Running applications on a server in data center 104 permits usage based charging of fees. In traditional software licensing models the cost is the same to a user independent of how much they use the system. The techniques described above have the potential to provide a lower cost entry point for customers in which the customer is charged for time or features used, points stored, amount of data collected and so on. It is also possible to charge different rates for different customers. Different rates could be charged for different sizes of customers and different nationalities.

A further factor in pricing involves the use of other vendor field equipment. The techniques described above have the potential to provide support for other vendor field equipment. This could allow offering the service to users with other vendor's equipment, including at a higher price rate or at a lower level of functionality.

The techniques described above have the potential to gather surveying data from GPS and other GNSS positioning technologies and optical total stations. Further devices from which surveying data can be gathered include laser range finders and levels, manual input devices such as tape measures, digital cameras and cell phones including PXT photo messages.

Example Computing System

Figure 5:
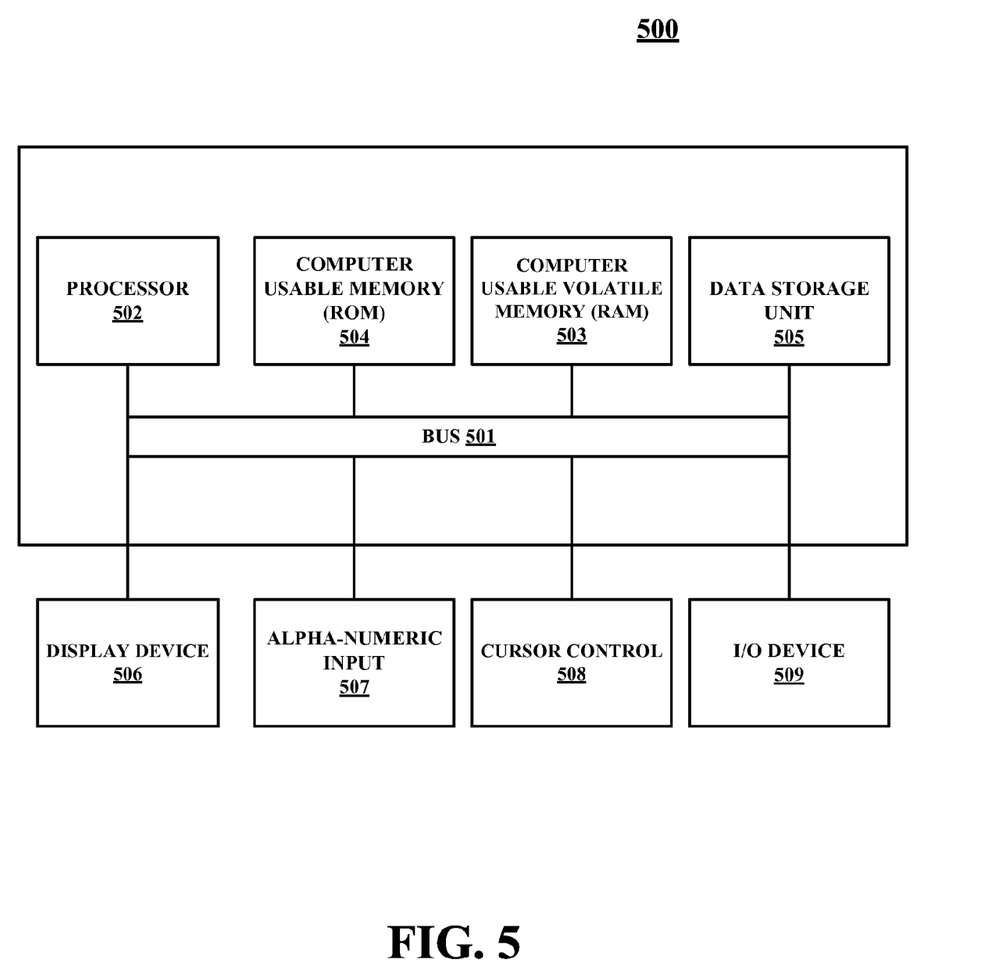
FIG. 5 is a block diagram of a computer system in accordance with one embodiment of the present technology.

Referring now to FIG. 5, a diagram of computer system 500 in accordance with one embodiment of the present invention is shown in greater detail. Within the discussions herein, it should be noted that certain processes and steps are discussed that are realized, in one embodiment, as a series of instructions (e.g., updatable application 201 program) that reside within computer readable memory units of system 500 and executed by processor 502 of system 500. When executed, the instructions cause the computer system 500 to perform specific functions and exhibit specific behavior as described.

In general, computer system 500 used by the embodiments of the present invention comprises an address/data bus 501 for communicating information, one or more central processors 502 coupled with the bus 501 for processing information and instructions, a computer readable volatile memory unit 503 (e.g., random access memory, static RAM, dynamic, RAM, etc.) coupled with the bus 501 for storing information and instructions for the central processor(s) 502, a computer readable non-volatile memory unit 504 (e.g., read only memory, programmable ROM, flash memory, EPROM, EEPROM, etc.) coupled with the bus 501 for storing static information and instructions for the processor(s) 502.

System 500 also includes a mass storage computer readable data storage device 505 such as a magnetic or optical disk and disk drive coupled with the bus 501 for storing information and instructions. Optionally, system 500 can include a display device 506 coupled to the bus 501 for displaying information to the computer user (e.g., maintenance technician, etc.), an alphanumeric input device 507 including alphanumeric and function keys coupled to the bus 501 for communicating information and command selections to the central processor(s) 502, a cursor control device 508 coupled to the bus for communicating user input information and command selections to the central processor(s) 502, and a signal generating input/output device 509 coupled to the bus 501 for communicating command selections to the processor(s) 502.

Example GNSS Receiver

With reference now to FIG. 6, a block diagram is shown of an embodiment of an example GNSS receiver which may be used in accordance with various embodiments described herein. In particular, FIG. 6 illustrates a block diagram of a GNSS receiver in the form of a general purpose GPS receiver 680 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s).

Embodiments of the present technology may be utilized by GNSS receivers which access the L1 signals alone, or in combination with the L2 signal(s). A more detailed discussion of the function of a receiver such as GPS receiver 680 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 680 of FIG. 6.

In FIG. 6, received L1 and L2 signal is generated by at least one GPS satellite. Each GPS satellite generates different signal L1 and L2 signals and they are processed by different digital channel processors 652 which operate in the same way as one another. FIG. 6 shows GPS signals (L1=1575.42 MHz, L2=1227.60 MHz) entering GPS receiver 680 through a dual frequency antenna 601. Antenna 601 may be a magnetically mountable model commercially available from Trimble® Navigation of Sunnyvale, Calif., 94085. Master oscillator 648 provides the reference oscillator which drives all other clocks in the system. Frequency synthesizer 638 takes the output of master oscillator 648 and generates important clock and local oscillator frequencies used throughout the system. For example, in one embodiment frequency synthesizer 638 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 634 performs filtering and low noise amplification of both L1 and L2 signals. The noise figure of GPS receiver 680 is dictated by the performance of the filter/LNA combination. The downconverter 636 mixes both L1 and L2 signals in frequency down to approximately 175 MHz and outputs the analogue L1 and L2 signals into an IF (intermediate frequency) processor 30. IF processor 650 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 652 inputs the digitally sampled L1 and L2 inphase and quadrature signals. All digital channel processors 652 are typically identical by design and typically operate on identical input samples. Each digital channel processor 652 is designed to digitally track the L1 and L2 signals produced by one satellite by tracking code and carrier signals and to form code and carrier phase measurements in conjunction with the microprocessor system 654. One digital channel processor 652 is capable of tracking one satellite in both L1 and L2 channels.

Microprocessor system 654 is a general purpose computing device which facilitates tracking and measurements processes, providing pseudorange and carrier phase measurements for a navigation processor 658. In one embodiment, microprocessor system 654 provides signals to control the operation of one or more digital channel processors 652. Navigation processor 658 performs the higher level function of combining measurements in such a way as to produce position, velocity and time information for the differential and surveying functions. Storage 660 is coupled with navigation processor 658 and microprocessor system 654. It is appreciated that storage 660 may comprise a volatile or nonvolatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Embodiments of the present invention are thus described. While the present invention has been described in numerous embodiments, the foregoing descriptions of embodiments of the present invention have been presented for purposes of illustration and description. They are not intended to be exhaustive or to limit the invention to the precise forms disclosed, and many modifications and variations are possible in light of the above teaching. The embodiments were chosen and described in order best to explain the principles of the invention and its practical application.

The invention claimed is:

1. A method for providing user interactive actual time networked surveying, said method comprising:
    establishing a network connection between a survey instrument and a central computing device;
    establishing a user session with the central computing device, the user session associated with the survey instrument;
    transmitting, to the central computing device, survey measurement data obtained with the survey instrument;
    receiving, at the central computing device, correction data from a virtual reference station (VRS);
    allowing said user session to direct the processing of the received survey measurement data including one or more real time kinematic calculations at the central computing device; and
    providing the output of the processing of the received survey measurement data to one or more authorized devices having a connection to said central computing device, said output provided in a concrete and tangible format.

2. The method of claim 1 further comprising:
    establishing a network connection between the survey instrument and a virtual reference station; and
    establishing a network connection between the virtual reference station and the central computing device.

3. The method of claim 2 further comprising:
    receiving the survey measurement data at the virtual reference station (VRS);
    enhancing the received survey measurement data with corrections data from the VRS to enhanced survey measurement data; and
    transmitting the enhanced survey measurement data to the central computing device.

4. The method of claim 1 further comprising:
    establishing a network connection between a virtual reference station and the central computing device; and
    transmitting correction data from the virtual reference station to the central computing device.

5. The method of claim 1 further comprising establishing a network connection between a plurality of computing devices and the central computing device.

6. The method of claim 5 further comprising providing access to two or more computing devices to the same set of survey measurement data.

7. The method of claim 6 wherein one of the computing devices comprises a portable computing device and one of the computing devices comprises a desktop computing device.

8. The method of claim 7 wherein two of the computing devices comprise portable computing devices.

9. The method of claim 1 further comprising computing one or more positions in one or more co-ordinate reference frames.

10. The method of claim 1 further comprising establishing a network connection between a portable computing device and the central computing device.

11. The method of claim 10 wherein establishing the user session is performed on the portable computing device.

12. The method of claim 10 further comprising:
    generating status and/or quality information at the central computing device on the received survey measurement data; and
    transmitting the generated status and/or quality information to the portable computing device.

13. The method of claim 10 further comprising establishing a network connection between the survey instrument and the portable computing device.

14. The method of claim 10 further comprising receiving the survey measurement data at the central computing device at a first epoch rate; and
    transmitting data to the portable computing device at a second epoch rate, where the first epoch rate is different to the second epoch rate.

15. The method of claim 10 wherein the survey instrument is in a first location and the second portable computing device is in a second location.

16. The method of claim 15 wherein the first location is a hazardous location.

17. The method of claim 15 wherein the first location is unsuitable for a human operator.

18. The method of claim 10 wherein the survey instrument is positioned on an unmanned vehicle.

19. The method of claim 1 further comprising executing a data collector application on the central computing device to facilitate receiving data at the central computing device.

20. The method of claim 1 further comprising executing several sets of real time kinematic calculations simultaneously.

21. The method of claim 20 further comprising calculating a user position from several base station base streams.

22. A user interactive actual time networked survey system comprising:
    at least one user selectable survey device from a pool of selectable survey devices;
    a measurement data receiver module configured to receive raw measurement data from said at least one user selectable survey device and correction data from at least one virtual reference station (VRS) in actual time;

a measurement data processing module for processing said raw measurement data in conjunction with said correction data in actual time to generate actual time corrected measurement data; and a graphical user interface (GUI) for presenting said actual time corrected measurement data in a user understandable format.

23. The system of claim 22 further comprising:

a network accessible data repository to store said raw measurement data and said corrected measurement data, said data repository having real-time multiple user accessibility.

24. The system of claim 23 wherein said network accessible data repository stores said correction data from said at least one VRS.

25. The system of claim 22 further comprising:

a current status information module to provide current status information for said at least one user selectable survey device on said GUI, said current status information selected from the group consisting of: position, satellites in view and battery level.

26. The system of claim 22 wherein said correction data is automatically selected and automatically applied to said raw measurement data to generate said corrected measurement data and said corrected measurement data is automatically provided to said GUI.

27. The system of claim 22 wherein said correction data is user selected and applied to said raw measurement data via user input to generate said corrected measurement data.

* * * * *